ically unsaturated.">
United States Patent Office 3,183,433
Patented May 11, 1965

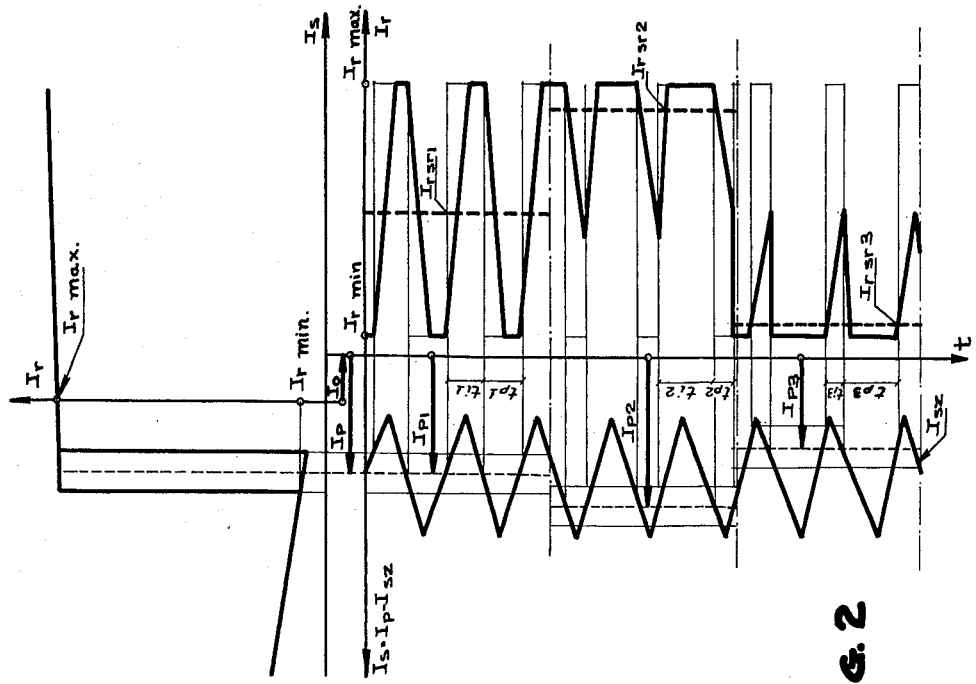

3,183,433
IMPULSE REACTOR-TYPE REGULATOR
Jerzy Kazimierz Soldek, Gdansk, Poland, assignor to Politechnika Gdanska of Katedra Elektroenergetyki, Gdansk, Poland, and Gdansk Technical University-Chair of Elecfrotechnics, Gdansk, Poland
Filed Nov. 27, 1961, Ser. No. 155,151
6 Claims. (Cl. 323—89)

This invention relates to a regulator making use of a saturable core reactor operating by means of impulses.

For the purpose of regulating electrical processes, physical processes, technical processes and other types of processes, many types of regulators are used. Regulators in which electrical reactors are the main components are widely used. The known regulators of this type use reactors which have a continuous characteristic. Reactors with a step output characeristic are used in regulating systems as control or auxiliary elements. Regulators of the type having a step characteristic are used to obtain more or less current feedback in the electrode circuits of arc furnaces or in time lag circuits, in which the reactor is controlled by an RC network. The operation of reactors in known systems is characterized by a fixed operating point and by maximum and minimum current; that is, by a static state. The present invention is a reactor-type regulator with a principle of operation based on impulses and regulation performed according to a dynamic characteristic. The reactor used in the regulator has two determined states of operation, saturated and unsaturated, but it is subject to continuous oscillation between these two states. Consequently at the output of the reactor, which is an independent regulator, there are produced intermediate values of electric current ranging between the maximum and minimum values. This operation results from the action of functional feedback originating from the setting or regulating value.

As a result of this action, an oscillation in the regulator's output current takes place. The intermediate electric current values depend upon the value of the control current. The relation between the duration of the variation toward saturation and the duration of the variation towards unsaturation varies in accordance with the value of the control current. The means value of the load current of the reactor depends upon the relation between these two periods. The principle of the operation of the impulse reactor-type regulator of the present invention can be better understood by comparing it with the operation of a Tirill-type vibration contact regulator, which also produces a continuous variation of the regulating value even though the regulator's output structure is in the form of contacts which are subject to two states of operation, that is being closed or open. The impulse reactor-type regulator as used for example to regulate synchronous generated voltage consists of a saturable core reactor equipped with load measuring polarization functional feedback and positive internal feedback windings, of rectifiers and auxiliary resistors, as well as A.C. and D.C. supplies. The reactor's load current, after being converted in a bridge connected rectifier, flows through a load resistance inserted in the load current of a D.C. supply and consequently influences the setting of the output current of the D.C. supply. The measuring, polarization, and functional feedback windings provide ampere turns adjusted to one another in such a manner that when their regulating value agrees with the setting, the periods of variation toward the reactor's saturation and non-saturation, between which the reactor switches continuously back and forth due to oscillation in the functional feedback winding, remain the same. The functional feedback winding produces magnetic intensity with pulsation amplitude equal to or greater than the width of the flux-current loop of the reactor's hysteresis characteristic.

When the regulating value agrees with the setting, the value of the difference of ampere turns in the measuring and polarization windings corresponds to the center of the width of the flux-current loop of the reactor's hysteresis characteristic as shown in FIG. 2. The direction of the difference of ampere turns is such that in case the regulating value is greater than the setting, the resulting ampere turns of the measuring and polarization windings will increase the reactor's load current.

The above type of regulator makes possible shortened response time for the reactor and improves the working stability. According to the invention, the impulse reactor-type regulator offers the following advantages as compared with the reactor-type regulator having a steady output: considerably greater speed of the regulator's response; better regulation, which makes superfluous the use of special stabilizing devices such as impulse transformers; a simpler circuit; fewer elements; smaller overall dimensions, and lower cost of manufacture.

Acccording to the invention the impulse reactor-type regulator may be used as a regulator of synchronous generator voltage, as a regulator of generator excitation and generator frequency, as an over-speed governor, and the like. In the case of regulating the synchronous generator excitation, the regulator's operation in the regulator circuit is as follows: the value of the regulated voltage is rated at the generator terminals by measuring current and the value and duration of the exciter voltage by feedback current. The polarizing current flowing through the reactor's polarization winding represents the setting. The resistance inserted in the load current acts as a setting element serving to regulate the exciting current, the setting and the regulator's current flowing through this resistance. The value of resistance for the setting circuit together with the increment of the regulator's current is increased due to this fact. The rectifier inserted in the above circuit acts in the blocking sense, limiting the regulator's action on the exciting circuit to the regulating resistor.

The objects and advantages of the present invention will become readily understood as the following detailed description of the invention unfolds and when taken in conjunction with the drawings, wherein:

FIG. 1 shows a circuit diagram of the regulator of the invention; and

FIG. 2 illustrates the current waveforms produced in the circuit of FIG. 2 and their relationship to the flux current loop of the saturable core reactor of the circuit of FIG. 1.

As shown in FIG. 1, the regulator comprises a saturable core reactor 1, a bridge connected full wave rectifier 2, a load resistance 3, a half wave blocking rectifier 4, an additional feedback resistance R, as well as an A.C. supply $E_1$ and a D.C. supply $E_2$. The saturable core reactor 1 has a load winding $a$, a measuring winding $b$, a polarization winding $c$, a functional feedback winding $d$, and a positive internal feedback winding $e$. The polarization winding $c$ can be used to provide the setting value of the regulator for comparison in case the setting value should be constant.

The function of the regulator will now be described. In the reactor 1, which is the basic element of the regulator, there takes place a comparison of the ampere turns of the current $I_p$ flowing through the measuring winding $b$, with the ampere turns of the current $I_o$ flowing through the polarization winding $c$. At the same time the current $I_{sz}$ flowing through the functional feedback winding $d$ stabilizes the regulation and by affecting the magnetic saturation state of the reactor 1 produces a continuous oscillation of the load current $I_r$ flowing through the load winding $a$ and the positive internal feedback winding $e$. This effect is the result of the functional feedback winding $d$ having such a number of turns as to produce magnetic field strength strong enough to desaturate the saturated magnetic core of the reactor 1 and at the same time bring about a sudden variation of the load current $I_r$ from the value $I_{r\,max}$ toward the value $I_{r\,min}$ as shown in FIG. 2. The feedback obtained is so strong as to cause the load current $I_r$ of the reactor, when it is at maximum, to return to its previous state. Just when the load current $I_r$ reaches its lowest point then the feedback decreases considerably, permitting the load current $I_r$ to increase again suddenly to its maximum point.

The load current $I_r$, on being converted to D.C. by the rectifier 2, flows through the load resistance 3 and fulfills a setting function in the outer circuit of the current supply $E_2$. The current supply $E_2$ causes a current $I_n$ to flow through the resistance R and the resistor 3, and the output current from the reactor 1 flowing through the resistor 3 influences the value of the current $I_n$. The blocking rectifier 4 limits the action of the output current of the reactor 1 to the load resistor 3.

Further circuitry in the regulating circuit depends upon the character of the process to be regulated and is indicated in FIG. 1 by the symbol A and the circuit connections between the circuitry A and the circuit comprising the reactor 1, the rectifier 2, the resistors 3 and R, the current supplies $E_1$ and $E_2$ and the rectifier 4 is schematically represented by the channel 7 in FIG. 1. The current supplied to the measuring winding $b$ of the reactor 1 is controlled by the apparatus A as illustrated by the dashed line in FIG. 1.

The reactor 1 can also be operated as an amplistat when provided additionally with a positive feedback winding allowing a summary feedback greater than unity to be obtained.

The reactor 1 has an output characteristic represented by the function $I_r = f(I_p - I_{sz})$. The current $I_r$ has two determining operating points, $I_{r\,min}$ and $I_{r\,max}$ as illustrated in FIG. 2. As a result of the coaction of the measuring winding $b$ through which current $I_p$ flows and the functional feedback winding $d$ through which current $I_{sz}$ flows, the reactor 1 is subject to continuous oscillations. The character of these oscillations depends upon the value of the total control current $I_s$ which is determined by subtracting $I_{sz}$ from $I_p$; that is, the relation between the impulse duration in the intervals $t_i$ and $t_p$ as shown in FIG. 2, as well as the value of the load current $I_r$ at the output of the reactor 1 are dependent upon the value of the control current $I_s$. In FIG. 2 there are illustrated three examples showing different conditions of operation of the regulator.

In the first example the regulating value agrees with the setting and is indicated in FIG. 2 by the value of current $I_{p1}$. In this example the output current from the reactor approaches $I_{r\,max}$ for a period $t_{11}$ and approaches $I_{r\,min}$ for a period $t_{p1}$. The ratio of the periods $t_{11}$ to $t_{p1}$ is equal to 1 and the reactor output current has a mean value of $I_{r\,sr1}$.

In the second example the regulating value is greater than the setting and corresponds to the value of current $I_{p2}$ in FIG. 2. In this example the output current of the reactor approaches $I_{r\,max}$ for a period $t_{12}$ and approaches $I_{r\,min}$ for a period $t_{p2}$. The ratio between these periods $t_{12}$ to $t_{p2}$ is greater than 1, and the output current of the reactor has a mean value of load current $I_{r\,sr2}$ which is greater than $I_{r\,sr1}$. In the third example the regulating value is smaller than the setting and corresponds to the value of current indicated as $I_{p3}$ in FIG. 2. In this example the output current of the reactor approaches $I_{r\,max}$ during a period $t_{13}$ and approaches $I_{r\,min}$ during a period $t_{p3}$. The ratio between these periods $t_{13}$ to $t_{p3}$ is less than 1 and the output current of the reactor $I_{r\,sr3}$ is less than $I_{r\,sr1}$. The speed at which the load current $I_r$ increases depends upon the value of the control current $I_s$ which equals $I_p - I_{sz}$.

To make the description of the operation of the invention easier to understand, the waveforms shown in FIG. 2 have been simplified by making use of the following assumptions. In all three examples the feedback current $I_{sz}$ was assumed to be produced in the same manner. In actuality this current will be dependent upon the load current and consequently it will stabilize the regulating process, maintaining at the same time the pulsating character of the reactor's operation. Also the effects of lag and inertia in the regulator circuit have been neglected with the exception of the speed at which the reactor's load current $I_r$ increases depending upon the control current $I_s$. In actuality both currents $I_r$ and $I_{sz}$ will not be formed exactly as has been described, but the character of the operation of the regulator will nevertheless be as has been described.

The regulator of the present invention may be employed for the purpose of regulating the voltage of synchronous generators and other quickly changing quantities. It may also be used for regulating slowly changing quantities, for example regulating the water level in tanks of water power installations, but in this case it must be provided with retarding elements.

What is claimed is:

1. A regulator comprising a saturable core reactor having a load winding, a polarizing winding, a measuring winding, a functional feedback winding, and a positive internal feedback winding, a rectifier having a pair of A.C. input terminals and a pair of D.C. output terminals, an A.C. current source, a circuit connecting the A.C. input terminals of said rectifier and said load winding in series across said A.C. source, a first load resistance, a circuit connecting said positive internal feedback winding and said first load resistance in series across the D.C. output terminals of said rectifier, a D.C. source, a second load resistance, a circuit connecting said D.C. source and said second load resistance in series with each other across said first load resistance, and means to apply a feedback current to said functional feedback winding varying in accordance with the current flowing in said load resistances, the ampere-turns and polarity of the measuring, polarization and functional feedback windings being related in such a manner that said reactor switches continuously back and forth between saturated and unsaturated states and that the relationship of the period when the current flowing in the load winding of said reactor varies towards its maximum and the period when such current varies towards its minimum varies in accordance with the current flowing in said measuring winding, and that the pulsation amplitude of the magnetic field strength produced by the functional feedback winding is greater than the width of the flux current loop of the hysteresis characteristic of said reactor.

2. A regulator comprising a saturable core reactor having a load winding, a polarizing winding, a measuring winding, a functional feedback winding, and a positive internal feedback winding, a rectifier having a pair of A.C. input terminals and a pair of D.C. output terminals, an A.C. current source, a circuit connecting the A.C. input terminals of said rectifier and said load winding in series across said A.C. source, a first load resistance, a circuit connecting said positive internal feedback winding and said first load resistance in series across the D.C. output terminals of said rectifier, a D.C. source, a second load resistance, and a blocking rectifier, a circuit connecting said D.C. source and said second load resistance and said blocking rectifier in series with each other across said first load resistance, and means to apply a feedback current to said functional feedback winding varying in accordance with the current flowing in said load resistances, the ampere-turns and polarity of the measuring, polarization and functional feedback windings being related in such a manner that said reactor switches continuously back and forth between saturated and unsaturated states and that the relationship of the period when the current flowing in the load winding of said reactor varies towards its maximum and the period when such current varies towards its minimum varies in accordance with the current flowing in said measuring winding, and that the pulsation amplitude of the magnetic field strength produced by the functional feedback winding is greater than the width of the flux current loop of the hysteresis characteristic of said reactor.

3. A regulator comprising a saturable core reactor having a load winding, a measuring winding, a functional feedback winding, and a positive internal feedback winding, a rectifier having a pair of A.C. input terminals and a pair of D.C. output terminals, an A.C. current source, a circuit connecting the A.C. input terminals of said rectifier and said load winding in series across said A.C. source, a first load resistance, a circuit connecting said positive internal feedback winding and said first load resistance in series across the D.C. output terminals of said rectifier, a D.C. source, a second load resistance, a circuit connecting said D.C. source and said second load resistance in series with each other across said first load resistance, and means to apply a feedback current to said functional feedback winding varying in accordance with the current flowing in said load resistances, means coupling an apparatus to be controlled to at least one of the load resistances, and means coupling the measuring winding to the apparatus to be controlled.

4. A regulator according to claim 3, including a polarization winding and means to provide current to said polarization winding.

5. A regulator comprising a saturable core reactor having a load winding, a measuring winding, a functional feedback winding, and a positive internal feedback winding, a rectifier having a pair of A.C. input terminals and a pair of D.C. output terminals, an A.C. current source, a circuit connecting the A.C. input terminals of said rectifier and said load winding in series across said A.C. source, a first load resistance, a circuit connecting said positive internal feedback winding and said first load resistance in series across the D.C. output terminals of said rectifier, a D.C. source, a second load resistance, and a blocking rectifier, a circuit connecting said D.C. source and said second load resistance and said blocking rectifier in series with each other across said first load resistance, and means to apply a feedback current to said functional feedback winding varying in accordance with the current flowing in said load resistances, means coupling an apparatus to be controlled to at least one of the load resistances, and means coupling the measuring winding to the apparatus to be controlled.

6. A regulator according to claim 5, including a polarization winding and means to provide current to said polarization winding.

References Cited by the Examiner
UNITED STATES PATENTS
3,040,229  6/62  Lapuyade _____ 323—89 X LLOYD McCOLLUM, *Primary Examiner.*